F. H. PATTEN.
AUTOMOBILE LIGHTING SYSTEM.
APPLICATION FILED MAY 23, 1919.
1,404,890.
Patented Jan. 31, 1922.
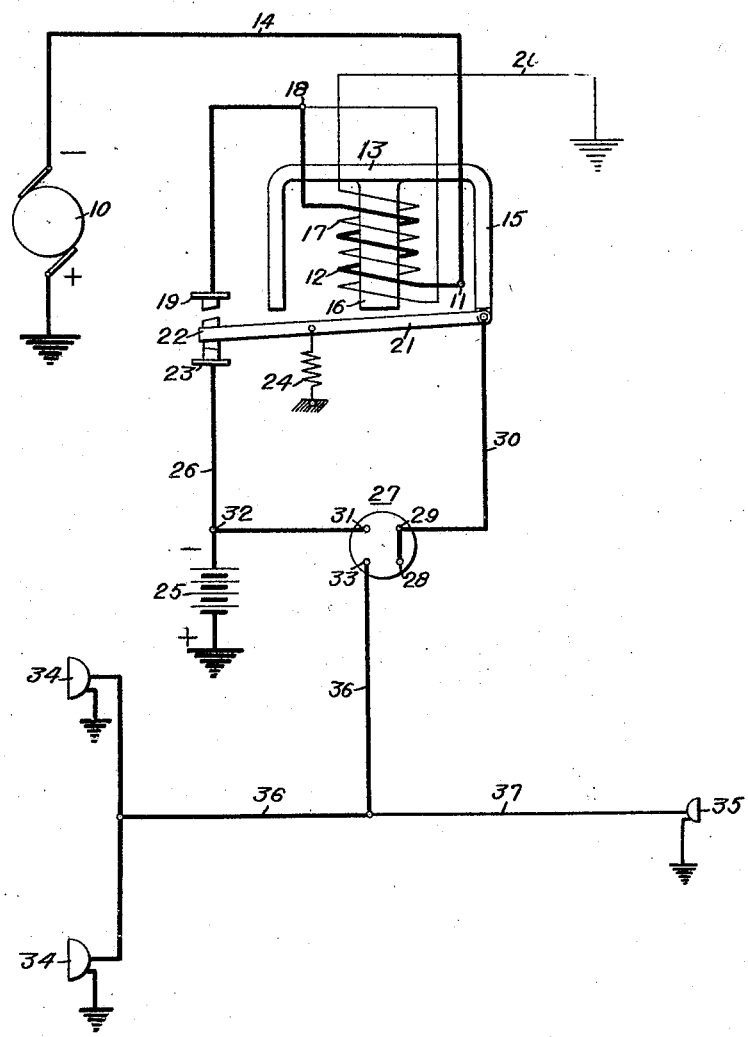
WITNESSES:
J. A. Helsel
N. M. Biebel
INVENTOR
Francis H. Patten.
BY
Wesley G. Carr
ATTORNEY

UNITED STATES PATENT OFFICE.

FRANCIS H. PATTEN, OF EDGEWOOD PARK, PENNSYLVANIA, ASSIGNOR TO WESTING-HOUSE ELECTRIC & MANUFACTURING COMPANY, A CORPORATION OF PENNSYLVANIA.

AUTOMOBILE LIGHTING SYSTEM.

1,404,890. Specification of Letters Patent. Patented Jan. 31, 1922.

Application filed May 23, 1919. Serial No. 299,165.

*To all whom it may concern:*

Be it known that I, FRANCIS H. PATTEN, a citizen of the United States, and a resident of Edgewood Park, in the county of Allegheny and State of Pennsylvania, have invented a new and useful Improvement in Automobile Lighting Systems, of which the following is a specification.

My invention relates to automobile lighting systems and particularly to controlling devices therefor.

One object of my invention is to provide a control system for automobile lighting circuits that will preclude connecting both the lamps and the storage battery simultaneously to the charging generator.

Another object of my invention is to provide a simple and inexpensive controlling device for automobile lighting systems which will automatically connect the lamps on an automobile to the storage battery if the charging generator is not operating at or above a predetermined speed at which its voltage equals that of the battery.

Where a low-capacity generator and a relatively small storage battery are used on a moving vehicle, with an intermittent load, such as lamps, it is necessary to have some means for preventing connection of the lamps and the storage battery to the generator at the same time, and also means for automatically disconnecting the lamps from the generator and for connecting them to the storage battery in case the generator voltage is below a predetermined value, after having been connected to the generator, so as not to interrupt the current supply to the lamps.

In practising my invention, I provide a reverse-current relay having a voltage and a current winding thereon and having also a plurality of contacts on the biased armature, in connection with a three-way switch of standard constructions and connect these devices as will hereafter be described.

The single figure of the drawing is a diagrammatic view of the device embodying my invention and the connections therefor.

10 is a direct-current automobile lighting generator of relatively small output which is intermittently driven, in any approved manner, by an automobile engine (not shown). This generator is of a type which is inherently self-regulating for constant voltage at varying speeds and is not dependent upon the cooperating storage battery for its voltage regulation. One of the brushes of generator 10 is connected to ground and the other brush is connected to a contact terminal 11 of a current coil 12 of a reverse-current relay 13 by means of a conductor 14. The relay 13 may be of any well-known construction but, as here shown, it comprises an essentially U-shaped core member 15 and a central core member 16 of soft iron. A voltage coil 17 is mounted on the central core member 16, as is also the current coil 12. The other contact terminal 18 of the current coil 12 is connected to one terminal of the voltage coil 17 and also to a stationary contact member 19 located close to the relay 13. The other terminal of the voltage coil 17 is connected to ground through a conductor 20.

The relay 13 has an armature 21 pivotally connected, at one end, to the core member 15 and has a double contact member 22 suitably mounted thereon near its free end. The contact member 22 engages the contact member 19 when the arm 21 is attracted by the magnetization of the core 16 and engages the contact member 23 when the armature is drawn away from the core 16, upon the demagnetization thereof, by a suitable spring 24.

A storage battery 25 is provided, one terminal of which is connected to the contact member 23 through a conductor 26 while the other terminal is connected to ground. As here shown, the positive terminal of the generator 10 and that of the storage battery 25, are connected to ground but this is not an essential point. A three-way switch 27 of standard construction is provided, and the two connected contact terminals 28 and 29 thereof are connected to the armature 21 of the relay 13 by means of a conductor 30. A contact terminal 33 of the switch 27 is connected to one terminal of the energy-consuming devices, here shown as a plurality of headlights 34 and a tail light 35, by means of conductors 36 and 37, the other terminal of these devices being connected to ground.

Assume that the generator 10 is not being operated and that the switch 27 connects the terminals 31 and 28 so that the lamps 34 and 35 are inoperative. If now, the generator 10 is operated at a speed sufficient to generate the normal voltage, current will flow through the conductor 14, the current coil 12 to the terminal 18, then through the voltage coil 17, through the conductor 20 to ground and from thence back to the generator 10 through its grounded terminal. The current coil is so connected, with regard to the voltage coil, that, when the current is flowing through the circuit, as above described, the two coils will cooperate to produce the necessary flux. The magnet core 16 will be energized and will attract the armature 21, and the contact 22 on the arm 21 will operatively engage the contact terminal 19. This will close the following circuit to charge the storage battery 25; from the negative brush of generator 10, through conductor 14 to contact terminal 11, through the current coil 12 to contact terminal 18 to contacts 19 and 22, through arm 21, conductor 30 to contact terminals 29 and 28 of switch 27, through the switch arm to contact terminal 31 to contact terminal 32, and then through the battery 25 to the grounded terminal and back to the generator. If now, the generator 10 speed decreases and its voltage falls below that of the battery, the battery 25 will send a current through the above circuit in the reverse direction, and the flux, in the core member 16, due to the current coil 12, will be reversed, the core 16 will be deenergized and the armature 21 released and drawn to its lower position by the action of the spring 24. The circuit through the generator 10 is thus interrupted, and the battery 25 is prevented from discharging through the inoperative generator.

If the generator is operating and charging the storage battery and it is desired to operate the lights or other translating devices, the switch 27 is so thrown as to connect contact terminals 33 and 29. The current from the generator will then flow, as described above, to contact terminal 29 of the switch 27 and then through the switch arm to contact terminal 33, and thence, through the translating devices, to ground and back to the generator. If the generator speed decreases to the predetermined value, the operation of the device will be, as follows: the current from the generator, through the voltage coil 17 of the relay 13, will be interrupted, and the spring 24 will so move the armature 21 as to cause the contact terminal 22 to engage the contact terminal 23. This will interrupt the flow of current from the generator but will establish a new circuit from the storage battery 25, as follows: from the battery 25 to contact terminal 32, conductor 26, contact terminals 23 and 22, armature 21, conductor 30, contact terminals 29 and 33, and then through conductors 36 and 37, through the translating devices 34 and 25, to ground.

If it is desired to interrupt the flow of current through the translating devices, it is only necessary to operate the switch 27 to connect terminals 31 and 28 when the circuit will be open.

It is apparent that it is impossible for the above devices and connections to connect the storage battery and the translating devices to the generator simultaneously and overload it. It is also apparent that, if the translating devices are being operated by the generator, and it is desirable or necessary to shut down the generator, the load will be automatically connected to the storage battery and its operation continued without appreciable interruption of the flow of current.

It is apparent that modifications may be made without departing from the spirit and scope of my invention, and I desire that only such limitations shall be imposed as are indicated by the prior art or are specifically set forth in the appended claims.

I claim as my invention:

1. In an electric lighting system, the combination with an intermittently-operated dynamo, a storage battery and translating devices, of means, comprising a reverse current relay having a plurality of operative positions and a three-way switch, for selectively controlling the connection of said translating devices to said dynamo and to said battery and for precluding the connection of said dynamo to said translating devices and to said battery simultaneously.

2. In an electric lighting system, the combination with an intermittently-operated dynamo, a storage battery, translating devices, and a three-way switch, of means, comprising a plural-position reverse-current relay, for selectively connecting said translating devices to said battery when the dynamo is inoperative and to said dynamo when it is operative, when said three-way switch is in one position, said devices being inoperative to connect said dynamo to said translating devices and to said battery simultaneously.

3. In an electric lighting system, the combination with an intermittently-operated dynamo, a storage battery and translating devices, of means, comprising a plural-position reverse-current relay and a three-way switch for controlling the connection of said devices to the one or the other source of energy and for precluding the simultaneous connection of said translating devices and said battery to said dynamo in any position of said switch.

4. In an electric lighting system, the combination with an intermittently-operated dynamo, a storage battery adapted to be charged by said dynamo, and translating devices, of means, comprising a plural-position reverse-current relay and a manually operable three-way switch controlling the connections of said devices, battery and dynamo and for precluding simultaneous connection of said dynamo and said battery to said translating devices in any position of said switch.

5. In an electric lighting system, the combination with an intermittently-operated, variable-speed dynamo, a storage battery, current-consuming devices and a three-way switch, of automatic means for electrically connecting said current-consuming devices to said dynamo when same is operating under predetermined voltage conditions and for connecting said current-consuming devices to said storage battery when said dynamo is inoperative, said means being inoperative to connect said devices and said battery to said dynamo simultaneously in any position of said switch.

6. In an electric lighting system, the combination with an intermittently-operated dynamo, a storage battery, translating devices and a three-way switch, of a plural-position reverse-current relay for electrically connecting said translating devices only to said dynamo when the same is operating under predetermined voltage conditions and for disconnecting said translating devices from said dynamo and connecting them to said storage battery when said dynamo is inoperative.

7. In an electric lighting system, the combination with an intermittently-operated dynamo, a storage battery, current-consuming devices and a three-way control switch, of a plural-position reverse-current relay for connecting said storage battery to said dynamo when the same is operating and for disconnecting said battery from said dynamo when same is inoperative, when said three-way switch is in one position, and for connecting said current-consuming devices to said dynamo when the same is operating and for connecting said current-consuming devices to said battery when said dynamo is inoperative when said three-way switch is in the other position.

8. In a lighting system for moving vehicles, the combination with an intermittently-operated, variable-speed generator, a storage battery, translating devices and a three-way switch connected between the two sources of current and the translating devices, of an electro-magnetic switch having a voltage coil, a current coil normally cooperative with the voltage coil and a plurality of cooperating contacts, said electromagnetic switch being operative to connect either the translating devices only or the storage battery only to the generator under predetermined voltage conditions of the generator when the three-way switch is in certain of its positions and to open the circuit of the generator when the latter is inoperative, with the three-way switch in either of its operative positions.

9. In a lighting system for moving vehicles, the combination with an intermittently-operated, variable-speed generator, a storage battery, energy-consuming devices and a three-way switch connected between the two sources of current and the energy-consuming devices, of an electromagnetic plural-position switch, having a voltage coil, a current coil normally cooperative with the voltage coil, said electromagnetic switch being operative to connect the energy-consuming devices to the battery when the generator is inoperative and to disconnect the energy-consuming devices from the storage battery and to connect either the battery only or said devices only to the generator when the generator is operated under predetermined voltage conditions, according as the three-way switch is in the one or the other of its operative positions.

In testimony whereof, I have hereunto subscribed my name this 17th day of May, 1919.

FRANCIS H. PATTEN.